UNITED STATES PATENT OFFICE.

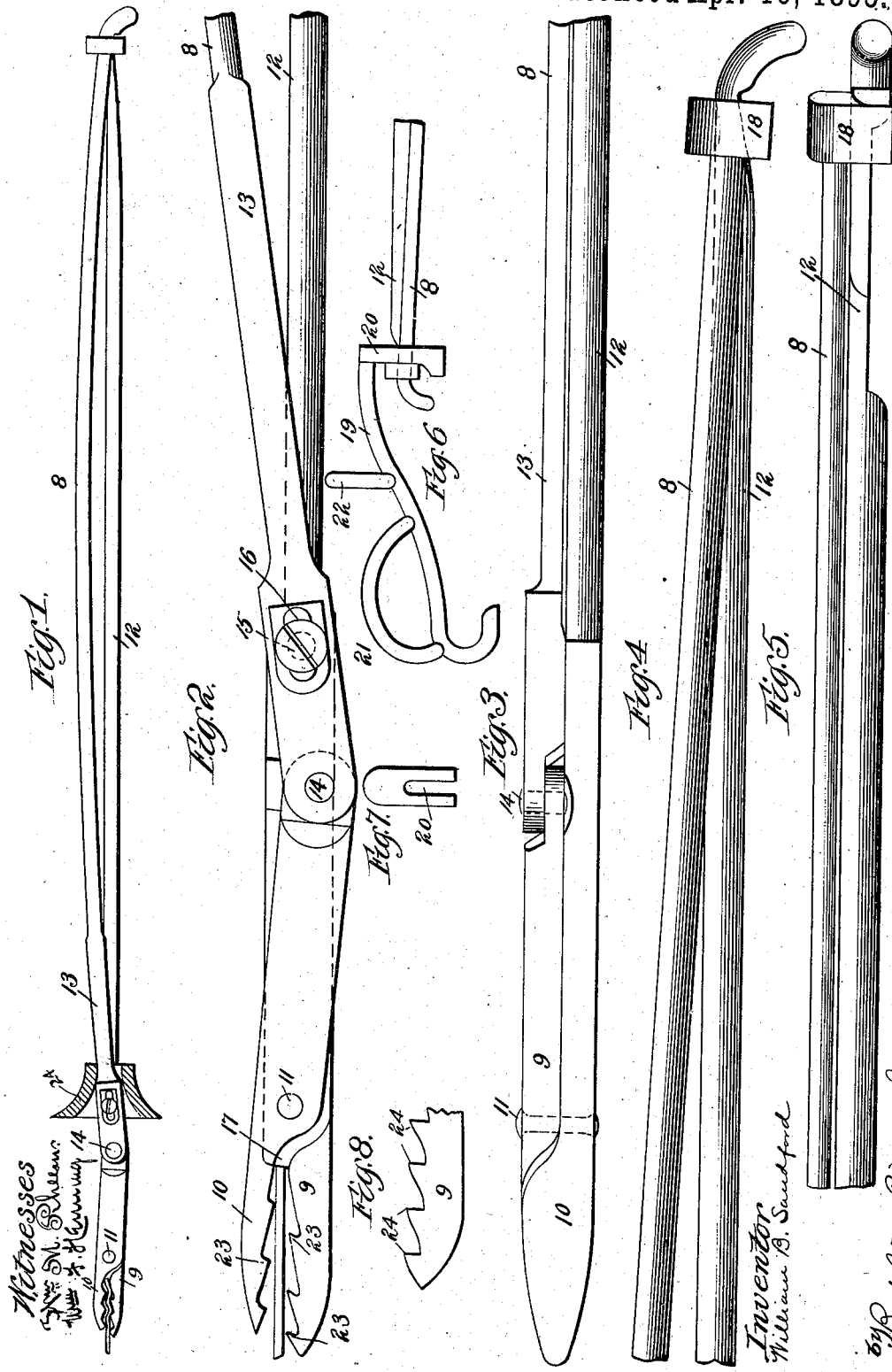

WILLIAM B. SANDFORD, OF KEWANEE, ILLINOIS.

PIPE-DRAWING TOOL.

SPECIFICATION forming part of Letters Patent No. 537,484, dated April 16, 1895.

Application filed April 24, 1894. Serial No. 508,884. (No model.)

*To all whom it may concern:*

Be it known that I, WILLIAM B. SANDFORD, a citizen of the United States, residing at Kewanee, Henry county, Illinois, have invented certain new and useful Improvements in Pipe-Drawing Tools, of which the following is a specification, reference being had to the accompanying drawings, in which—

Figure 1 is a side view showing the jaws of the tongs closed, as in gripping the skelp or plate from which the pipe is to be made. Fig. 2 is an enlarged view showing the jaws, pivot and parts of the handles of the tongs. Fig. 3 is a bottom plan view of the parts shown in Fig. 2. Fig. 4 is a side view of the ends of the handles, showing the position which they assume when the skelp is first gripped. Fig. 5 is a plan view of the parts shown in Fig. 4. Fig. 6 is a side view of the hook by means of which the tongs are attached to the endless belt by means of which the skelp is drawn through the forming and welding bell, showing the hook connected to the handles of the tongs. Fig. 7 is a view of one end of the hook, showing the fork by means of which it is secured to the tongs; and Fig. 8 shows a modification of the teeth.

My invention relates to tools for making butt weld pipe by drawing a skelp through a bell, and has for its object to provide an improved tool by means of which the skelp can be seized after it has been heated, and then drawn through the bell. I accomplish this object as hereinafter specified and as illustrated in the drawings.

That which I regard as new will be set forth in the claims.

Heretofore the great difficulty with pipe drawing tongs has been that a firm enough grip of the skelp could not be secured and the tongs be so constructed as to be easily manipulated. As is well known, great force must be exerted upon the skelp in drawing it through the bell, and such force must be increased as the skelp moves through the bell, making the liability of the tongs slipping from the skelp much greater during the latter part of the operation than the first. To overcome the increased liability of slipping, I have constructed a pair of tongs so arranged that the greater the pull upon them the tighter will be their grip upon the skelp, consequently effectually preventing slipping. I have also provided a pair of tongs having teeth of an improved construction, by which a more secure grip upon the skelp can be obtained.

In the drawings—8 indicates a pair of tongs, having jaws 9—10 pivoted together by a pivot 11, and having handles 12—13. The handle 12 and jaw 9 are rigidly secured together so as to form in effect a single piece. The handle 13 is pivotally connected by a pivot 14 to the jaw 10, as best shown in Fig. 2. The handle 13 is pivotally connected to the handle 12 by the pivot 15, which passes through an elongated slot 16 in the handle 13 and is secured in the handle 12, as shown in Fig. 2. By this construction, as the jaws 9—10 are opened or closed the handle 13 will move longitudinally in one direction or the other.

As shown in Fig. 2, the jaws 9—10 are provided with teeth 23, which are spaced a considerable distance apart, the teeth of the upper jaw being arranged opposite the spaces between the teeth of the lower jaw. By this arrangement, when the skelp is gripped by the jaws it is crimped or fluted, which makes the grip of the jaws upon it much more secure. In order to further strengthen the grip, the inner faces of the teeth 23 are made concave, as shown in Fig. 2, so that when the teeth become embedded in the skelp they will be prevented from slipping when the skelp is pulled through the bell.

A shoulder 17 is provided on the jaw 9, which serves as a stop to limit the extent to which the skelp may be moved between the jaws.

As best shown in Fig. 5, the handle 13 of the tongs is of such shape as to permit it to spring more or less, the object being to permit the ends of the handles to be secured together even though the jaws are slightly separated, as in gripping the skelp, as shown in Fig. 1. The handles are adapted to be locked together by means of a collar 18, which is fixedly secured to the handle 13 and is provided with a recess adapted to receive the handle 12. The recess in the collar 18 is of sufficient size to receive the end of the handle 12 loosely, so that the collar may move longitudinally of the handle when necessary. I prefer to make the end of the handle 12 somewhat narrower than the main portion of it, so that a smaller recess may be used in the collar 18.

When the skelp is gripped by the tongs the ends of the handles are secured together as above described, and the parts of the tongs will then be in the position shown in Fig. 1. By now pulling on the handle 13 it will be moved longitudinally upon the other handle 12, and will also be brought into line with said handle 12. This will turn the handle 13 upon its pivot 15 sufficiently to bring the forward portion of the handle 13 into line with the rear portion of the jaw 10 and with the jaw 9, forcing the jaws 9—10 closer together. The movement of the handle 13 will increase its leverage, as the pivot 15 will lie nearer the forward end of the slot 16 than before, making the forward arm of the lever shorter. It will be seen, therefore, that the greater the pull upon the handle 13 the tighter will be the grip of the jaws 9—10.

With my improved tongs I use an endless belt of the usual form, for furnishing the power to pull the skelp through the bell, and connect the handle 13 of the tongs with such belt by means of a hook 19 having a fork 20. The hook 19 is adapted to be secured to the endless belt, and the fork 20 is of such size and shape as to fit over the handle 13 forward of the collar 18, as shown in Fig. 6. By this arrangement the pull is applied to the handle 13 exclusively. The hook 19 is provided with a handle 21 and a hand rest 22, as shown in Fig. 6. Sometimes a carriage is used instead of the hook 19, but its operation is substantially the same.

When the tongs gripping the skelp are drawn through the bell, the forward end of the handle 13 and the rear end of the jaw 10, being slightly out of line, will engage the inner surface of the bell and will be forced into line with the handle 12 by their passage through it, thereby still more tightly closing the jaws together.

The degree of concavity of the inner faces of the teeth 23 may be varied, provided such faces are not made to incline toward the point of the tongs. In the modification illustrated in Fig. 8 I have shown the inner faces of the teeth as being substantially perpendicular to the skelp, and taking such arrangement as the limit, any degree of concavity may be given them.

I do not wish to limit myself to arranging the teeth specifically as shown, as such arrangement may be varied without departing from the spirit of my invention, which consists, broadly stated, in bending that portion of the skelp which is gripped between the jaws out of a straight line.

It should be understood that the word skelp is herein used to apply to the strip of metal which is to be drawn through the bell regardless of whether or not such strip has been previously treated to make it adapt itself more readily to tubular form.

That which I claim as my invention, and desire to secure by Letters Patent, is—

1. A pipe-drawing tool, consisting of a fixed gripping jaw, a movable gripping jaw pivoted thereto, a fixed handle and a movable handle, said movable handle being pivotally connected to and operating the movable gripping jaw, and means for increasing the leverage of the movable handle as the jaws are operated to grip a skelp between them, substantially as specified.

2. A pipe-drawing tool, consisting of a stationary gripping jaw 9, and a movable gripping-jaw 10, for gripping a skelp, of a stationary handle 12, a movable handle 13 pivoted to the stationary handle 12 and movable longitudinally thereof, said pivoted handle being connected to said movable jaw, substantially as described.

3. The combination with a stationary jaw 9, a movable jaw 10 pivoted thereto, a stationary handle 12 connected to said stationary jaw, and a movable handle 13, having a slot 16, of a pivot 15 connecting said movable handle 13 to said handle 12, a pivot 14, and a collar 18, substantially as described.

4. A pipe-drawing tool, consisting of a fixed gripping jaw and a movable gripping jaw pivoted together, for gripping a skelp, a fixed handle and a movable handle, said movable handle being adapted to operate the movable jaw and being movable longitudinally of said stationary jaw and handle, substantially as described.

5. A pipe-drawing tool, consisting of a fixed gripping jaw and a movable gripping jaw pivoted together, for gripping a skelp, a fixed handle and a movable handle, said movable handle being adapted to operate said movable jaw and being loosely pivoted to said stationary handle, whereby it may be moved longitudinally of said stationary jaw and handle, substantially as described.

WILLIAM B. SANDFORD.

Witnesses:
H. W. TRASK,
H. L. DAY.